(12) United States Patent
Fourney

(10) Patent No.: US 10,689,203 B2
(45) Date of Patent: Jun. 23, 2020

(54) WET CASE DETECTOR IN A CONVEYOR BELT

(71) Applicant: Laitram, L.L.C., Harahan, LA (US)

(72) Inventor: Matthew L. Fourney, Laurel, MD (US)

(73) Assignee: Laitram, L.L.C., Harahan, LA (US)

( * ) Notice: Subject to any disclaimer, the term of this patent is extended or adjusted under 35 U.S.C. 154(b) by 43 days.

(21) Appl. No.: 16/305,250

(22) PCT Filed: Jun. 12, 2017

(86) PCT No.: PCT/US2017/036951
§ 371 (c)(1),
(2) Date: Nov. 28, 2018

(87) PCT Pub. No.: WO2017/218376
PCT Pub. Date: Dec. 21, 2017

(65) Prior Publication Data
US 2020/0109009 A1 Apr. 9, 2020

Related U.S. Application Data

(60) Provisional application No. 62/350,286, filed on Jun. 15, 2016.

(51) Int. Cl.
*B65G 43/00* (2006.01)
*B65G 17/08* (2006.01)
*B65G 15/32* (2006.01)

(52) U.S. Cl.
CPC ............. *B65G 43/00* (2013.01); *B65G 15/32* (2013.01); *B65G 17/08* (2013.01); *B65G 2203/0266* (2013.01); *B65G 2203/044* (2013.01)

(58) Field of Classification Search
CPC ........ B65G 43/02; B65G 43/00; B65G 15/30; B65G 15/32
(Continued)

(56) References Cited

U.S. PATENT DOCUMENTS 2,889,941 A * 6/1959 Mehlis ...................... B07C 3/20
198/367
3,938,116 A 2/1976 Schneider
(Continued)

FOREIGN PATENT DOCUMENTS

CN 202083645 U 12/2011
DE 10045261 A1 4/2001
(Continued)

OTHER PUBLICATIONS

Ontrack Automation Inc., "OnTrack Detects Wet Cases Before They Reach the Pallet" article, Packaging World, Apr. 27, 2011; https://www.packworld.com/article/ontrack-detects-wet-cases-they-reach-pallet.
(Continued)

*Primary Examiner* — James R Bidwell
(74) *Attorney, Agent, or Firm* — Catherine M. Bishop

(57) ABSTRACT

A detector detects the presence of liquid on a conveyed product using optics. The detector comprises a light source adjacent to a conveyor belt for directing a light beam into the conveyor belt body towards a top conveying surface and a light receiver for detecting the light beam after it reflects off of the top conveying surface. A reduction in intensity of the reflected light beam may indicate the presence of wetness on the top conveying surface.

20 Claims, 2 Drawing Sheets

(58) Field of Classification Search
 USPC .............................................. 198/502.1, 846
 See application file for complete search history.

(56) References Cited

U.S. PATENT DOCUMENTS

| | | | |
|---|---|---|---|
| 6,232,603 B1 | 5/2001 | Nelson | |
| 6,260,693 B1* | 7/2001 | Mohr | B65G 15/00 198/502.1 |
| 6,323,477 B1 | 11/2001 | Blasing et al. | |
| 7,751,054 B2 | 7/2010 | Backes | |
| 7,911,356 B2 | 3/2011 | Wohlfahrt et al. | |
| 9,702,818 B2* | 7/2017 | Kroekel | B60S 1/0844 |
| 10,365,178 B2* | 7/2019 | Ling | G01M 3/045 |
| 2002/0020804 A1 | 2/2002 | Bauer et al. | |
| 2008/0256771 A1* | 10/2008 | Spoors | B29D 29/06 29/428 |
| 2008/0308391 A1 | 12/2008 | May | |
| 2010/0208060 A1* | 8/2010 | Kobayashi | B60S 1/0844 348/135 |
| 2013/0206545 A1 | 8/2013 | Bogle et al. | |
| 2013/0235381 A1* | 9/2013 | Kroekel | B60S 1/0844 356/445 |
| 2013/0277179 A1* | 10/2013 | Teranishi | B65G 15/30 198/834 |
| 2017/0267460 A1* | 9/2017 | Buchwald | B65G 43/02 |

FOREIGN PATENT DOCUMENTS

| | | |
|---|---|---|
| JP | S6038635 A | 2/1985 |
| JP | 5066995 B2 | 11/2012 |
| WO | 2014065930 A1 | 5/2014 |

OTHER PUBLICATIONS

TRW Automotive—Body Control Systems Europe and Emerging Markets, "Rain Sensor" brochure, Sep. 26, 2002; available from: http://s.hswstatic.com/pdf/rain-sensor.pdf.
European Search Report for European Application No. 17813856.6, dated Jan. 20, 2020, European Patent Office, Munich, Germany.

* cited by examiner

WET CASE DETECTOR IN A CONVEYOR BELT

RELATED APPLICATIONS

The present application claims priority to U.S. Provisional Patent Application Ser. No. 62/350,286, filed Jun. 15, 2016, and entitled "Wet Case Detector in a Conveyor Belt," the contents of which are herein incorporated by reference.

FIELD OF THE INVENTION

The invention relates to power-driven conveyors. More particularly, the invention relates to a conveyor that can sense wetness in a conveyed product.

BACKGROUND OF THE INVENTION

Conveyors are used to convey products from a first location to a second. In palletizing applications, a conveyor conveys cases of product, which may be containers filled with liquid, to a palletizer. It may be desirable to detect leakage of product before sending a wet case to a palletizer.

SUMMARY OF THE INVENTION

A detector detects the presence of liquid on a conveyed product using optics. The detector comprises a light source adjacent to a conveyor belt for directing a light beam into the conveyor belt body towards a top conveying surface and a light receiver for detecting the light beam after it reflects off of the top conveying surface. A reduction in intensity of the reflected light beam may indicate the presence of wetness on the top conveying surface.

According to one aspect, a conveyor, comprises a transparent conveyor belt body extending from a top conveying surface to an opposite bottom surface and a liquid sensor adjacent the conveyor belt body for detecting moisture on the conveying surface. The liquid sensor comprises a light source for directing a light beam into the conveyor belt body towards the top conveying surface and a light receiver for detecting the light beam after it reflects off the top conveying surface.

According to another aspect, a method of detecting moisture in a conveyed product on a top surface of a conveyor belt comprises the steps of emitting a light beam from a light source into a body of a conveyor belt, directing the light beam towards the top surface of the conveyor belt at a selected angle of incidence and detecting a reflected light beam from the top surface to determine the presence or absence of moisture in the conveyed product.

DETAILED DESCRIPTION

A detector detects wetness on a conveyed device using light reflection. The invention will be described relative to certain illustrative embodiments, though one skilled in the art will recognize that the invention is not limited to the illustrative embodiments.

Figure 1:
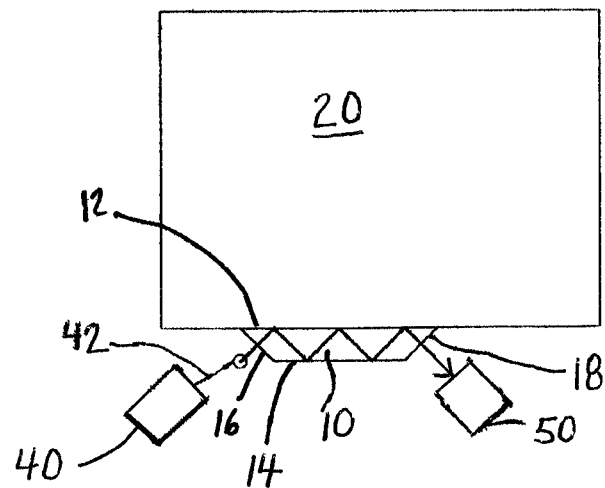
FIG. 1 is a schematic view of a conveyor having a conveyor belt for conveying a package and including a sensor system for detecting the presence of liquid on the conveyed package.

FIG. 1 is a schematic view of a conveyor suitable for detecting wetness on a conveyed package. The conveyor includes conveyor belt 10 conveying a package 20 and a sensor system for detecting wetness on the conveyed package. The conveyor belt may comprises a plurality of hingedly connected modules forming a circuit or be a continuous body connected end-to-end to form the circuit. One or more modules or portions of the conveyor belt can be a sensing module or portion comprising a transparent body having an upper conveying surface 12, an opposite bottom surface 14 and side surfaces 16, 18. The side surfaces 16, 18 are angled relative to the top surface 12 and bottom surface 14. The transparent body has a selected refractive index.

The conveyor further includes a light source 40 that directs a light beam 42 into the transparent body through the first side surface 16 towards the upper conveying surface 12 at a selected angle of incidence. As shown, the side surfaces 16, 18 are angled to allow the light beam 42 to hit the top surface at a 45° angle of incidence, entering and exiting the body at an angle of incidence of 90°. The illustrative light source 40 is a stationary source within the frame of the conveyor that is triggered to emit and direct the light beam 42 when a sensing module (a module or portion of the conveyor capable of transmitting the light beam) passes. Alternatively, the light source 40 can be embedded within the body of the conveyor belt or coupled to a bottom surface or a side surface of the conveyor belt. The light source directs the light beam 42 at a selected angle of incidence to allow total internal reflection when the light beam hits the upper conveying surface in the absence of liquid on the upper conveying surface. However, because a wet surface has a different refractive index, the presence of moisture at the top conveying surface will change the reflection and allow some of the light beam to be transmitted through the liquid. A receiver, such as a photo eye 50, adjacent the second side surface 18 detects the reflected light beam. The receiver 50 is programmed to detect a change in the intensity of the reflected beam caused by the presence of liquid on a package.

In response to a signal from the receiver that a wet package has been detected, an alarm may sound, or a corrective action may be automatically taken. For example, a controller may turn on a light to indicate a wet package, or emit an audible alarm. The controller may stop the conveyor when a wet package is sensed, deflect a wet package from the conveyor or take any other suitable corrective action.

Figure 2:
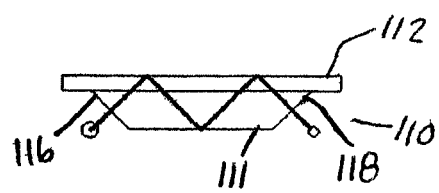
FIG. 2 shows an embodiment of a two-piece sensing module for detecting the presence of liquid.
Figure 3:
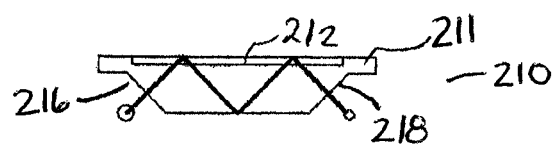
FIG. 3 shows another embodiment of a sensing module for detecting liquid.
Figure 4:
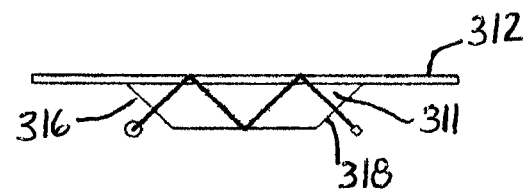
FIG. 4 shows another embodiment of a sensing module for detecting liquid.

As shown in FIGS. 2-4, sensing modules or portions of the conveyor belt can be all one piece, or can comprise multiple pieces. For example, FIG. 2 shows a conveyor belt module 110 capable of detecting wetness comprising a base 111 with angled side walls 116, 118 and an upper conveying layer 112 bonded to the base 111. FIG. 3 shows a conveyor belt module 210 capable of detecting wetness comprising a base 211 with angled side walls 216, 218 and an inlaid upper layer 212. In another embodiment, shown in FIG. 4, a clear conveyor belt 312 is bonded to a sensing module 311 having angled side walls 316, 318 to detect wetness on the upper surface of the clear conveyor belt 312. Each sensing unit directs a light beam from a light source to a receiver. The light source and receiver can be triggered to take readings as each unit passes a particular position. Software can be used to detect and disregard faulty modules.

The sensing portions for detecting wetness can comprise any suitable material that allows a light beam to pass, for example, glass, clear plastic and other materials known in the art.

Figure 5:
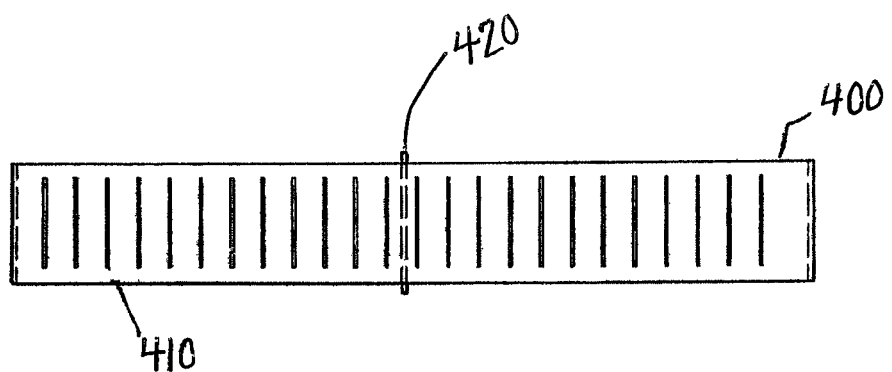
FIG. 5 is a top view of a conveyor belt capable of detecting liquid on a conveyed package.
Figure 6:
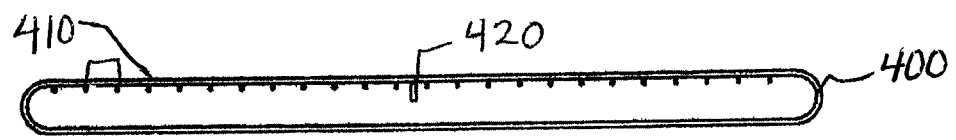
FIG. 6 is a side view of the conveyor belt of FIG. 6.

FIGS. 5 and 6 show an embodiment of a transparent conveyor belt 400 suitable for detecting wetness on a conveyed item or on the conveying surface. The conveyor belt 400 includes a plurality of sensing portions 410 having angled side walls bonded to an upper transparent conveyor belt. A sensing mechanism 420 comprising a light source and receiver samples each sensing portion as it passes to identify the presence of moisture on the conveyor belt top surface. The sensing portions can be mounted in any orientation and array size.

In one embodiment, the sensing mechanism 420 measures light reflection for each sensing portion 410, tracking the intensity of the reflected light for each sensing portion 410. Over time, the detected light intensity on even a dry upper surface may degrade due to scratches or other deterioration. An embodiment of the invention keeps a running average for each sensing portion or module. A reading inconsistent with the average light intensity may indicate the presence of moisture. Even if a sensing portion degrades by 20% over time, moisture on the upper surface will still result in a larger degradation in intensity, allowing detection of moisture even in the presence of degradation. Using multiple measurements over time and keeping a running average for each sensing portion, prevents false readings due to slow degradation.

Various alternatives to the invention may be made, and the invention is not limited to the description above.

What is claimed is:

1. A conveyor, comprising:
    a transparent conveyor belt body extending from a top conveying surface to an opposite bottom surface;
    a liquid sensor adjacent the conveyor belt body for detecting moisture on the conveying surface, the liquid sensor comprising a light source for directing a light beam into the conveyor belt body towards the top conveying surface and a light receiver for detecting the light beam after it reflects off the top conveying surface.

2. The conveyor of claim 1, wherein the liquid sensor recognizes wetness on the top conveying surface based on the intensity of the reflected light beam.

3. The conveyor of claim 2, further comprising logic for triggering an alarm when the liquid sensor recognizes wetness on the top conveying surface.

4. The conveyor of claim 1, wherein the transparent conveyor belt body comprises multiple layers of transparent material.

5. The conveyor of claim 1, wherein the liquid sensor directs the light beam at a 45° angle of incidence relative to the top conveying surface.

6. The conveyor of claim 1, further comprising a trigger for triggering a reading by the light receiver.

7. The conveyor of claim 1, wherein the conveyor comprises multiple hingedly connected conveyor belt modules, at least one of the modules containing the transparent conveyor belt body.

8. The conveyor of claim 1, wherein the transparent conveyor belt body has a first angled side surface into which the light source directs the light beam and a second angled side surface through which the reflected light beam passes into the light receiver.

9. A method of detecting moisture in a conveyed product on a top surface of a conveyor belt, comprising the steps of:
    emitting a light beam from a light source into a body of a passing conveyor belt;
    directing the light beam towards the top surface of the conveyor belt at a selected angle of incidence; and
    detecting a reflected light beam from the top surface using a light receiver to determine the presence or absence of moisture in the conveyed product.

10. The method of claim 9, wherein a reduction in intensity in the reflected light beam indicates the presence of moisture in the conveyed product.

11. The method of claim 9, further comprising the step of triggering an alarm if moisture is present in the conveyed product.

12. The method of claim 9, wherein the body of the conveyor belt has a first angled side edge into which the light source directs the light beam and a second angled side edge through which the reflected light beam passes into the light receiver.

13. The method of claim 9, further comprising the step of maintaining a running average for the intensity of the reflected light beam and comparing a detected intensity with the running average to determine the presence or absence of moisture in the conveyed product.

14. The conveyor of claim 1, further comprising a sensing portion having angled side walls coupled to the transparent conveyor belt body for directing the light beam into and from the top conveying surface.

15. The method of claim 9, wherein the conveyor belt includes a transparent sensing portion, and the light source emits a light beam when the sensing portion passes.

16. A conveyor, comprising:
    an upper transparent conveyor belt having an upper conveying surface;
    a transparent sensing portion having angled side walls bonded to the upper transparent conveyor belt; and
    a sensing mechanism comprising a light source for directing a light beam through a first angled side wall of the transparent sensing portion towards the upper conveying surface and a light receiver adjacent a second angled side wall of the transparent sensing portion for detecting the light beam after it reflects off the upper conveying surface to detect the presence of moisture in a product conveyed by the upper conveying surface.

17. The conveyor of claim 16, wherein the light source is a stationary source within the frame of the conveyor that is triggered to emit and direct the light beam when the transparent sensing portion passes.

18. The conveyor of claim 16, further comprising a plurality of transparent sensing portions, each having angled side walls bonded to the upper transparent layer.

19. The conveyor of claim 18, wherein the sensing mechanism samples each transparent sensing portion as it passes the sensing mechanism.

20. The conveyor of claim 19, wherein the sensing mechanism maintains a running average for the intensity of the reflected light beam for each transparent sensing portion and comparing a detected intensity with the running average to determine the presence or absence of moisture in the conveyed product.

* * * * *